United States Patent Office 3,730,928
Patented May 1, 1973

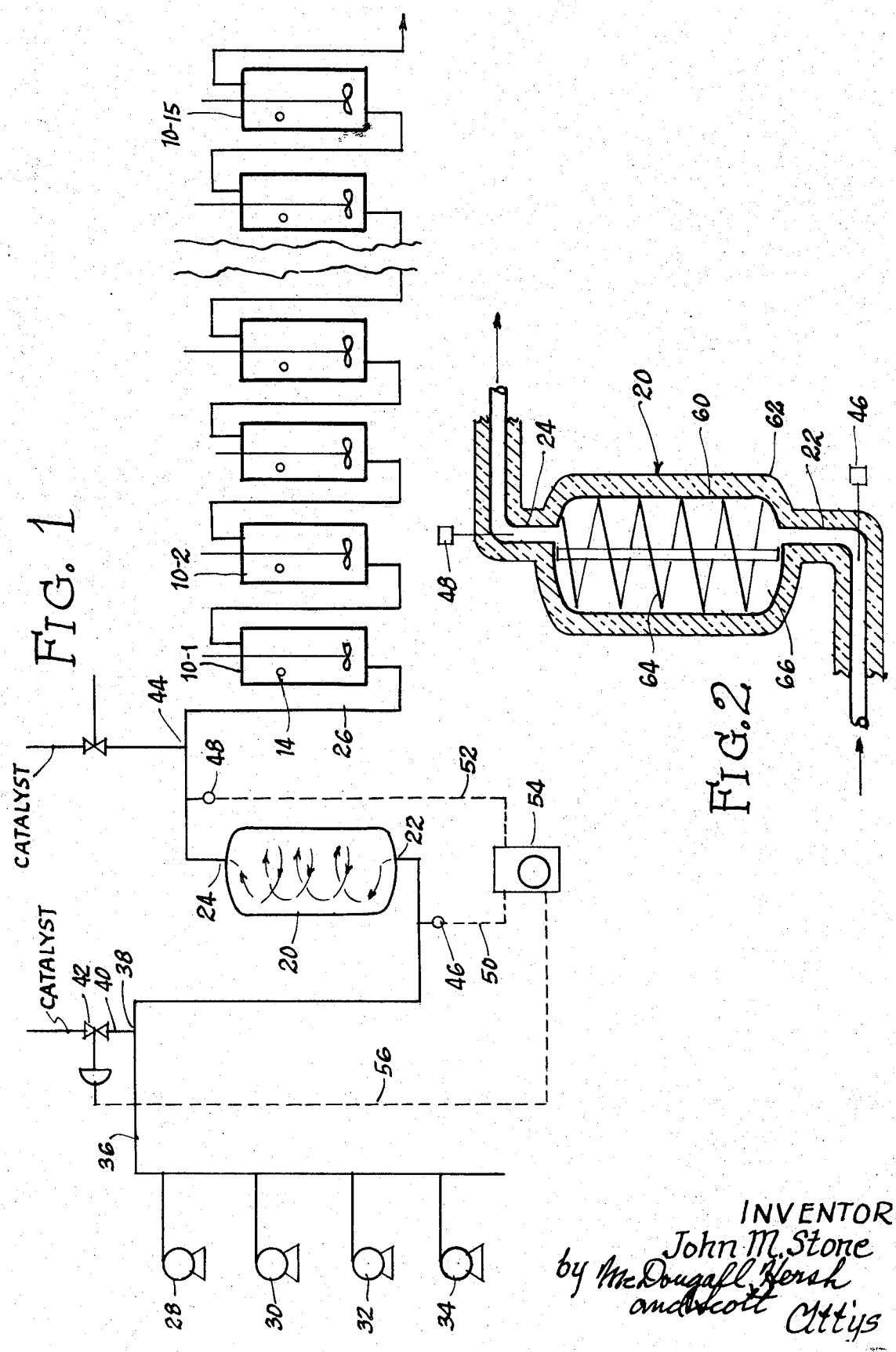

3,730,928
METHOD AND APPARATUS FOR CONTROLLING REACTION RATE
John M. Stone, Baton Rouge, La., assignor to Copolymer Rubber & Chemical Corporation, Baton Rouge, La.
Continuation-in-part of application Ser. No. 820,868, May 1, 1969. This application Feb. 9, 1971, Ser. No. 113,856
The portion of the term of the patent subsequent to Aug. 17, 1988, has been disclaimed
Int. Cl. C08d 1/09, 3/04, 3/06
U.S. Cl. 260—29.7 R    7 Claims

ABSTRACT OF THE DISCLOSURE

This invention is addressed to a new and improved method and apparatus for control of reaction rate in the aqueous emulsion polymerization of monomeric material to form elastomeric polymers wherein the monomeric material is passed into an elongate passage in a spiral path in combination with a small fraction of the catalyst to effect conversion of monomeric material to form polymer particles during flow through the passage, and the temperature rise in the monomeric material is measured during flow through the passage for determination of reaction rate to thereby enable the rate of catalyst added to be controlled to provide a uniform reaction rate.

This application is a continuation-in-part of my earlier copending application, Ser. No. 820,868, filed May 1, 1969, now U.S. Pat. No. 3,600,349.

This invention relates to synthetic rubbers, and more particularly to the preparation of synthetic rubbers by polymerization of monomeric materials in a continuous operation for control of the amount and rate of polymer formation whereby a rubber of more uniform characteristics is produced.

In my copending application Ser. No. 820,868, filed May 1, 1969, and entitled "Means and Method for Controlling Reaction Rate in Aqueous Emulsion Polymerization to form Elastomeric Polymers," description is made of a new and improved process and apparatus for the preparation of elastomeric polymers having improved uniformity in properties in which a small fraction of the polymerization catalyst is introduced to the monomeric material in advance of the reactor or reactors in which the bulk of the polymerization reaction takes place, such as by introducing a small fraction of the catalyst to the monomeric material prior to passage of the monomeric material through an elongate tubular pre-reaction vessel. The reaction rate can thus be measured by measuring the temperature increase over a given period of time as the reaction mass flows through the pre-reactor. The reaction rate data can then be used in controlling the amount and/or rate of addition of polymerization catalyst to facilitate uniform reaction rates and uniform levels of conversion to prepare an elastomeric polymer on a continuous basis having uniform characteristics.

As can be appreciated by those skilled in the art, the temperature change of the reaction mass as it is advanced through the pre-reactor with a small fraction of the catalyst is caused by the heat of reaction increasing the sensible heat of the reaction mass in proportion to the heat capacity of the reaction mass when the pre-reactor is operated under adiabatic conditions, that is without the loss or gain of heat from the surroundings. Thus, the temperature change is directly related to the rate of reaction where the following variables are known:

(1) Heat capacity of the reaction mass
(2) Time period between temperature measurements
(3) Order of reaction (i.e., first order, second order, etc.)
(4) Heat of reaction.

As indicated above, the pre-reaction of the reaction mass is preferably carried out adiabatically so that any changes in the temperature of the reaction mass can be attributed solely to the heat of reaction. As described in the foregoing copending application, heat loss or gain from the ambient atmosphere can be minimized by thermally insulating the pre-reactor. It has been found, however, that the volume of the pre-reactor should be sufficient to provide a residence time to allow temperature change of the reaction mass of at least 1° F. since the larger the temperature differential over the pre-reactor, the smaller is any error resulting from inaccuracy in temperature measurement.

Thus, while the method and apparatus described in the aforementioned copending application represents a significant improvement in the operation and control of polymerization reactions, there still exists a problem with respect to the accuracy of the temperature measurements. In order to obtain the desired residence time, use should be made of a pre-reactor having sufficient volume as indicated. When use is made of a pre-reactor having a high length-to-diameter ratio ($L/D$), the surface area available for heat transfer in the pre-reactor is increased with the result that unacceptable amounts of heat are lost to the ambient atmosphere in spite of thermal insulation. However, when the ratio of $L/D$ of the pre-reactor is decreased, the reaction mass passed therethrough is subjected to variations in the amount of back-mixing and flow channeling, thereby distorting the measurement of the change in temperature of the reaction mass with time due to variations in the average residence time of the reaction mass in the reactor.

It is accordingly an object of the present invention to provide new and improved method and apparatus for the polymerization of monomeric material in the preparation of elastomeric polymers in which the reaction rate is accurately determined and controlled.

It is another object of this invention to provide new and improved method and apparatus for the preparation of elastomeric polymers in which use is made of a pre-reactor, during an initial stage of the polymerization process, for controlling the amount and rate of polymerization in response to changes in temperature of the reaction mass in the pre-reactor, and in which use is made of a pre-reactor having a low surface area for heat transfer and characterized by an improved constant flow pattern.

These and other objects and advantages of the invention will appear more fully hereinafter, and, for purposes of illustration, but not of limitation, an embodiment of the invention is shown in the accompanying drawings in which:

FIG. 1 is a flow diagram of a process embodying the features of this invention; and FIG. 2 is a sectional view of a pre-reactor system embodying the features of this invention.

The concepts of the present invention reside in a method and apparatus for the polymerization of monomeric material by an exothermic reaction in the preparation of elastomeric polymers in which the reaction rate is determined by introducing a fraction of the catalyst to the monomeric material, passing the resulting reaction mass in a spiral pattern through a tubular pre-reaction zone and determining the temperature differential between the inlet and outlet of the reaction zone whereby the temperature differential can be adapted as a feed forward control to determine the reaction rate and the reactor charge stock reactivity and thereby regulate the rate of catalyst addition to achieve the calculated reaction rate and set point reactivity desired for the final product. When the pre-reactor system is combined with an in-line process computer responsive to temperature and heat balance data determined on the reaction mass passing therethrough, an automatic feed forward control of reactivity to the reactor system is provided which is responsive to effect balanced control within a few minutes with improved accuracy, as compared to other reaction rate control techniques having a time lag of the order of several hours.

In accordance with the apparatus of the invention, the pre-reactor system includes a reaction vessel having an inlet and an outlet and means for measuring the temperature of the reaction mass entering and leaving the system, and a spiral flight within the reaction vessel defining a spiral path through which the reaction mass is passed in a constant flow pattern. It has been found that the spiral path defined by the flight in the reactor enables use to be made of a reaction vessel having a volume sufficient to provide the desired residence time while minimizing the surface area of the reaction vessel which is available for heat transfer. In addition, the spiral path through the reaction vessel insures the desired constant flow pattern which approaches plug flow, thereby minimizing the degree of variations in back-mixing of the reaction mass during flow through the reactor which would otherwise distort the temperature measurements.

The invention is applicable to the preparation of synthetic rubbers by the aqueous emulsion polymerization of monomeric materials which produce latices of a synthetic polymer by polymerization in aqueous medium in the presence of micelle producing surfactants and polymerization catalyst. Representative of monomeric materials of which elastomeric polymers can be formed are the various conjugated butadiene, such as 1,3-butadiene, methyl-2-butadiene-1,3; piperylene, 2,3-dimethylbutadiene and chloroprene, as well as mixtures of such conjugated butadienes with other copolymerizable monomers, such as up to 50% or more by weight of a monomer which contains a monoolefinic group, as represented by the formula

wherein at least one of the disconnected valences is attached to an electroactive group, i.e., a group which substantially increases the electrical dissymmetry or polar character of the molecule. Representative of such monoolefinic monomers which may be copolymerized with butadiene monomers are aryl olefins, such as styrene and vinyl naphthalene, alpha-methyl carboxylic acids and their corresponding esters, nitriles and amides, such as acrylic acid, methacrylates, methyl methacrylate, acrylonitrile, methacrylonitrile, methacrylamide, and the like; isobutylene, methyl vinyl ether and methyl vinyl ketone. In some instances, the monomeric material may be a single monoolefinic compound containing the group

or a mixture of such compounds.

The polymerizable monomeric materials of this invention may be referred to herein as being selected of the group consisting of chloroprene, conjugated diolefins which are homopolymerizable to produce elastomeric polymers, or mixtures thereof with monoethylenically unsaturated monomers capable of producing copolymers therewith, and preferably rubbery polymers and copolymers. The invention is preferably practiced in a process for the production of rubber copolymers of butadiene and styrene in which the styrene is present in an amount up to 50% by weight with the remainder 1,3-butadiene to form a butadiene-styrene copolymer, generally referred to as SBR rubber.

The composition of polymerizable monomers is formulated to contain one or more micelle forming surfactants of the type generally employed in emulsion polymerization of the type described. Representative are the fatty acid soaps and preferably water-soluble long chain fatty acid soaps, such as sodium or potassium soaps of lauric, myristic, palmitic, oleic, stearic acids and the like; tall oil acids and rosins. Use can also be made of a secondary emulsifier such as one or a number of well known detergents, as represented by alkali metal sulfonates of aryl sulfonic acids, such as sodium alkyl naphthalene sulfonates.

The polymerizable composition is also formulated to contain a polymerization catalyst of the type commercially employed in such emulsion polymerization of elastomer forming monomers. Such catalyst can be a free radical initiator, as represented by organic hydroperoxides, such as paramethyl hydroperoxide, cumene hydroperoxide, diisopropyl benzene hydroperoxide and the like. Use can also be made of an activator in redox combination, such as ferrous sulfate or other suitable ionizable heavy metal salt.

It is desirable to make use of as little surfactant as possible. For example, it is preferred that the primary emulsifier, as represented by a fatty acid soap or rosinate, be maintained within a range of about 1 to 3 parts by weight per 100 parts by weight of monomer and that any secondary emulsifier be maintained within the range of about 0 to 0.2 part by weight per 100 parts by weight of monomer. The surfactant should be maintained at sufficiently low levels so that, as the polymerization proceeds, the polymerizing mixture passes through a viscous stage during which it may be readily agglomerated by intense agitation, followed by a reduction in viscosity and release of free surfactant into the aqueous phase.

A typical formulation of a polymerization recipe which can be used in the practice of this invention is as follows:

| Ingredient: | Parts by wt.[1] |
|---|---|
| Butadiene | 70 |
| Styrene | 30 |
| Rosin soap | 4.5 |
| Potassium chloride (muriate of potash) | 0.2 |
| Trisodium phosphate (anhydrous) | 0.2 |
| Sodium alkyl naphthalene sulfonate | 0.09 |
| Tetrasodium salt of ethylene diamine tetraacetic acid | 0.02 |
| Paramenthane hydroperoxide | 0.05 |
| Sodium formaldehyde sulfoxylate | 0.05 |
| Activator solution [2] | 0.90 |
| Modifier (tertiary mercaptan) | 0.17 |
| Sodium hydrosulfite | 0.02 |
| Water | 200.00 |

[1] Based on total monomer.
[2] The activator was a solution of 1.27 grams of sodium hydroxide, 2.31 grams of ethylene-diamine tetraacetic acid and 2.0 grams of ferrous sulfate hepta hydrate in water made up to 100 ml.

A GRS latex was prepared by the conventional cold rubber process using the recipe of the foregoing example with the polymerization being carried out at a temperature of about 40–60° F. and preferably about 43–45° F. In the hot rubber process, the reaction temperature may be within the range of 60–150° F. The polymerization was short-stopped at 55–60% conversion and the unreacted monomers were removed by conventional flashing and stripping.

It will be understood that other well-known recipes may be used for the polymerization of butadiene polymers and copolymers. An electrolyte may be present if desired, although it is preferred to omit the electrolyte for the production of foamed rubber having improved properties. For additional recipes and methods of preparation, reference can be made to U.S. Pats. Nos. 3,214,401, 3,272,768 and 3,247,146.

Having set forth the theoretical concepts of the invention, description will now be given in greater detail with reference to the schematic flow diagram of a substantially continuous operation for the preparation of an SBR rubber wherein use is made of a chain of reaction vessels 10–1, 10–2 to 10–15, in which copolymerization takes place as the composition undergoing polymerization flows from one vessel to the next with the polymerization calculated to be completed for short-stopping by the time it reaches the final vessel in the chain. Each vessel is provided with a stirrer 12 and a temperature sensing means 14 for measuring the progress of the polymerization and for controlling the polymerization conditions existing within the vessel.

In advance of the first reaction vessel 10–1, there is provided a pre-reactor or pre-initiator 20 in the form of an elongate tubular member having an inlet 22 at one end portion and an outlet 24 at the opposite end portion with the latter being connected by piping 26 to the inlet at the bottom side of the first reaction vessel 10–1 in the chain.

All of the ingredients with the exception of the material or materials to be used to regulate the reaction rate which may include catalyst, surfactant and/or initiator are metered through feed pumps 28, 30, 32, 34, etc. into a feed pipe 36 which communicates with the inlet 22 of the pre-reactor for the continuous introduction of the monomeric polymerizable system into the reactor.

The feed pipe 36 is provided with an inlet 38 beyond the pumps but in advance of the pre-reactor for introduction of the catalytic system through the feed pipe 40 at a rate controlled by the valve member 42 while the pipe 26 beyond the pre-reactor, is provided with an inlet 44 for the introduction of additional catalytic system after the pre-reacted ingredients have traversed the pre-reactor.

Temperature sensing means 46 and 48 are respectively provided for measuring the temperature rise that occurs during passage of the polymerizable materials through the pre-reactor. For this purpose, the one temperature sensing means 46 can be provided at the inlet portion to the pre-reactor and preferably in the feed line immediately prior to the inlet 22 while the other temperature sensing means 48 is arranged to measure the temperature of the liquid polymerizable material after initiation has been completed and preferably in the line 26 immediately adjacent the outlet 24 from the pre-reactor.

The temperature sensing means 46 and 48 are connected through lines 50 and 52 to a controller recorder 54 or computer wherein the temperature differential is calculated and computerized for operation through line 56 of a flow regulator 42 for the catalyst feed. In order to give significance to the temperature differential of the polymerizable liquids flowing through the pre-reactor, it is essential to provide adequate residence time, as by means of regulating flow rate to reactor volume ratio of the pre-reactor, which will enable conversion for the formation of polymer particles to be completed before the polymerizable materials leave the reactor. For the computation, it is desirable to know the total volume-flow rate through the pre-reactor; the heat of formation of the polymerizing polymer; the heat capacity of the reaction medium; the monomer concentration in the charge to the reactor and the affect of temperature change on reaction rate, all of which should be taken into consideration in the computation, except for such conditions as may be fixed. In order to minimize external heat losses from the pre-reactor, it is desirable to thermally insulate the reactor.

For most practical purposes with a recipe of the type described, it is desirable to operate with a residence time of less than 10 minutes and preferably within the range of 4–10 minutes and to operate within a range of temperature of 1–10° F.

In the pre-reactor, the activator, preferably in the form of a complex iron salt, introduced as a part of the catalytic system, is free to initiate the formation of polymer particles. Such initiation, which depends upon the amount of catalyst introduced, represents an exothermic reaction which brings about a temperature rise as the reaction takes place during passage of the polymerizable materials through the pre-reactor. Thereafter, any further additions of soap or catalyst will go only to the particles which have already been formed during passage through the pre-reactor, such that very few, if any, particles are initiated by reason of the subsequent addition of catalyst to the polymerizable material advanced to the first reaction vessel 10–1 or added in increments as the polymerizable liquid flows from vessel to vessel.

Thus, the number of particles initiated will be dependent upon the amount of catalyst introduced into the liquid monomeric system continuously fed into the pre-reactor or the feed ratio of catalyst to the feed rate of monomers in the continuous polymerization process. The temperature rise that takes place in the reaction to initiate the formation of particles in the pre-reactor is measured by the sensors and determined by the controller.

From the temperature rise, and the conditions previously described, the pounds of polymer capable of being formed per minute can be computed and from this data one can calculate the actual reaction rate at effluent temperature which can then be converted to reaction rate at standard temperature.

In practice, the amount of catalyst introduced to fix the rate will correspond to about ⅓ to ⅕ and preferably about ¼ of the total catalyst utilized in the polymerization reaction with the remainder introduced after the pre-initiation reaction, either in increments between reaction vessels or preferably in its entirety before the first reaction vessel.

The details of the pre-reactor 20 can best be understood by reference to FIG. 2 of the drawing. As illustrated in this figure, the pre-reactor system includes a generally tubular vessel 60 provided with an inlet conduit 22 and an outlet conduit 24. The inlet conduit 22 is provided, as indicated above, with temperature sensing means 46 adjacent to the vessel 60 to determine the temperature of the reaction mass entering the pre-reactor, and outlet conduit 24 is similarly provided with temperature sensing means 48 adjacent to vessel 60 to determine the temperature of the reaction mass leaving pre-reactor 20. The entire system is preferably insulated by means of insulation layer 62 surrounding the vessel 60 as well as at least the portions of conduits 22 and 24 in the vicinity of the temperature sensing means.

Contained within vessel 60 is a spiral flight 64 defining a spiral path 66 communciating on one end with the inlet conduit 22 and on the other end, with the outlet conduit 24. As can be appreciated by those skilled in the art, the spiral path serves to decrease the cross section flow area without increasing the surface area available for heat transfer. In addition, the spiral path has a sufficiently small cross section to provide a constant flow pattern with the result that variations in the average residence time of the reaction mass in the vessel are minimized.

The following data has been derived from the preparation of an SBR rubber using the polymerization recipe described above in continuous operation with a peroxide as a catalyst. The catalyst feed is interrupted after a few minutes of operation, and thereafter resumed as indicated in the following tabulation. Parts of peroxide catalyst shown are parts by weight peroxide per hundred parts by weight monomers.

| Time | Outlet temp. (° F.) | Inlet temp. (° F.) | Parts peroxide | Calculated reaction rate of stream exiting tube (percent conversion/ minute) corrected to 55° F. |
|---|---|---|---|---|
| 1413 | 50.6 | 46.5 | 0.10 | |
| 1414 | 50.8 | 46.5 | 0.10 | |
| 1415 | 50.8 | 46.5 | 0.10 | |
| 1416 | 50.8 | 46.5 | 0.10 | |
| 1417 | 50.7 | 46.7 | 0.10 | |
| 1418 | 50.6 | 46.6 | 0.00 | 0.475 |
| 1419 | 50.6 | 46.5 | 0.00 | 0.494 |
| 1420 | 50.7 | 46.5 | 0.00 | 0.494 |
| 1421 | 50.8 | 46.5 | 0.00 | 0.494 |
| 1422 | 50.7 | 46.5 | 0.00 | 0.475 |
| 1423 | 50.6 | 46.6 | 0.00 | 0.475 |
| 1424 | 50.6 | 46.6 | 0.00 | 0.475 |
| 1425 | 50.8 | 46.5 | 0.00 | 0.494 |
| 1426 | 50.2 | 46.4 | 0.00 | 0.494 |
| 1427 | 49.7 | 46.4 | 0.00 | 0.494 |
| 1428 | 49.4 | 46.5 | 0.00 | 0.475 |
| 1429 | 49.1 | 46.6 | 0.00 | 0.475 |
| 1430 | 48.8 | 46.6 | 0.00 | 0.494 |
| 1431 | 48.6 | 46.5 | 0.00 | 0.435 |
| 1432 | 48.4 | 46.5 | 0.00 | 0.370 |
| 1433 | 48.2 | 46.4 | 0.00 | 0.324 |
| 1434 | 48.1 | 46.5 | 0.00 | 0.304 |
| 1435 | 48.1 | 46.5 | 0.00 | 0.264 |
| 1436 | 48.0 | 46.6 | 0.11 | 0.252 |
| 1437 | 48.0 | 46.5 | 0.11 | 0.234 |
| 1438 | 48.0 | 46.5 | 0.11 | 0.210 |
| 1439 | 47.8 | 46.3 | 0.11 | 0.184 |
| 1440 | 47.8 | 46.4 | 0.11 | 0.184 |
| 1441 | 47.7 | 46.5 | 0.11 | 0.158 |
| 1442 | 47.7 | 46.5 | 0.11 | 0.158 |
| 1443 | 47.9 | 46.6 | 0.11 | 0.158 |
| 1444 | 48.2 | 46.5 | 0.11 | 0.152 |
| 1445 | 48.6 | 46.5 | 0.11 | 0.152 |
| 1446 | 49.3 | 46.4 | 0.11 | 0.152 |
| 1447 | 49.6 | 46.5 | 0.11 | 0.152 |
| 1448 | 49.9 | 46.5 | 0.11 | 0.152 |
| 1449 | 50.1 | 46.6 | 0.11 | 0.158 |
| 1450 | 50.2 | 46.5 | 0.11 | 0.210 |
| 1451 | 50.3 | 46.5 | 0.11 | 0.252 |
| 1452 | 50.3 | 46.4 | 0.11 | 0.324 |
| 1453 | 50.3 | 46.4 | 0.11 | 0.370 |
| 1454 | 50.3 | 46.5 | 0.11 | 0.394 |
| 1455 | 50.4 | 46.5 | 0.11 | 0.433 |
| 1456 | 50.4 | 46.5 | 0.11 | 0.494 |
| 1457 | 50.4 | 46.5 | 0.11 | 0.494 |
| 1458 | 50.3 | 46.4 | 0.11 | 0.494 |

It will be observed that the time displaced temperature rise in the pre-reactor is proportional to the calculated reaction rate. It will be further observed that a decrease in the temperature differential of the materials passing through the pre-reactor, indicative of a decrease in monomer conversion and reaction rate, automatically brings about an increase in the rate of addition in parts of catalyst per 100 parts by weight of monomer to compensate for this reduction in reaction rate and the amount of monomer conversion. Conversely, as the temperature differential increases, indicative of an increase in monomer conversion and reaction rate, the rate of addition of catalyst in parts per 100 parts of monomer automatically decreases to compensate for the increase in monomer conversion and reaction rate.

Thus, when the parameters of reaction rate and conversion are preset for a particular combination of polymerizable ingredients, the rate of introduction of catalyst both before and after the pre-reactor can be automatically controlled in response to the temperature differential as measured during passage of the polymerizable liquid through the pre-reactor.

It will be apparent from the foregoing that I have provided a simple and efficient method and means for effecting polymerization or copolymerization of butadiene type polymers and copolymers to achieve a more uniform conversion level for a predetermined end point. The described system represents a feed back controlling system with respect to means for maintaining a uniform reaction rate while at the same time providing a feed forward control of reactivity to the reactor system which is substantially immediately responsive to maintain uniform conversion levels.

It will be understood that various changes and modifications can be made in the details of formulation, procedure and use without departing from the spirit of the invention, especially as defined in the following claims.

I claim:

1. In the aqueous emulsion polymerization of monomeric material to form elastomeric polymers and copolymers of butadiene in the presence of a catalytic system containing a surfactant and an activator, the steps of passing the monomeric material through an elongate passage in a spiral path, introducing a small fraction of the catalyst to the monomeric material prior to flow through the passage to effect conversion of monomeric material to form polymer particles during flow through the passage, measuring the rise in temperature resulting from the exothermic reaction during flow through the passage for determination of reaction rate, adding the remainder of the catalyst to the polymerizable material subsequent to flow through the passage to carry out the polymerization reaction, adjusting the amount of catalyst in response to measurement of the temperature change and polymerizing the monomeric material to the corresponding polymer.

2. The process as claimed in claim 1 in which the passage represents a pre-reactor in the form of a tubular member located in advance of the polymerization reaction vessels.

3. The process as claimed in claim 1 in which the temperature rise is determined by measuring the temperature of the monomeric materials adjacent the entrance end of the passage and adjacent the exit end of the passage and adjacent the exit end of the passage to measure the exothermic reaction taking place during flow of the materials through the passage.

4. The process as claimed in claim 1 in which the amount of catalyst added before flow through the passage corresponds to an amount within the range of ⅓ to ⅕ of the total catalyst used in the polymerization reaction.

5. The process as claimed in claim 1 in which the catalyst is added to the monomeric materials before entrance into the passage.

6. The process as claimed in claim 1 in which the remainder of the catalyst is added in a single increment subsequent to flow of the polymerizable materials through the passage.

7. The process as claimed in claim 1 in which the remainder of the catalyst is added in separate increments.

References Cited
UNITED STATES PATENTS

| | | | |
|---|---|---|---|
| 3,035,040 | 5/1962 | Findlay | 260—94.9 |
| 3,558,045 | 1/1971 | Smith | 260—94.9 P X |
| 3,600,349 | 8/1971 | Stone | 260—29.7 |
| 2,769,804 | 11/1956 | Hanson | 260—95 C X |
| 2,989,517 | 6/1961 | Hanson et al. | 260—95 C X |

JAMES A. SEIDLECK, Primary Examiner

W. F. HAMROCK, Assistant Examiner

U.S. Cl. X.R.

260—82.1, 82.3, 83.5, 83.7, 85.3, 92.3, 94.2, 95